United States Patent
Jones

(10) Patent No.: US 12,526,292 B2
(45) Date of Patent: Jan. 13, 2026

(54) SECURITY THREAT REMEDIATION FOR NETWORK-ACCESSIBLE DEVICES

(71) Applicant: SOPHOS LIMITED, Abingdon (GB)

(72) Inventor: Craig Robert Jones, Wales (GB)

(73) Assignee: Sophos Limited, Abingdon (GB)

( * ) Notice: Subject to any disclaimer, the term of this patent is extended or adjusted under 35 U.S.C. 154(b) by 254 days.

(21) Appl. No.: 18/300,645

(22) Filed: Apr. 14, 2023

(65) Prior Publication Data
US 2023/0336573 A1 Oct. 19, 2023

Related U.S. Application Data

(60) Provisional application No. 63/331,308, filed on Apr. 15, 2022, provisional application No. 63/331,300, filed on Apr. 15, 2022.

(51) Int. Cl.
| | | |
|---|---|---|
| G06F 15/16 | (2006.01) | |
| G06F 9/54 | (2006.01) | |
| G06F 21/31 | (2013.01) | |
| G06F 21/54 | (2013.01) | |
| G06F 21/64 | (2013.01) | |
| H04L 9/40 | (2022.01) | |
| H04L 29/06 | (2006.01) | |

(52) U.S. Cl.
CPC .......... *H04L 63/1416* (2013.01); *G06F 21/31* (2013.01); *G06F 21/54* (2013.01); *G06F 21/64* (2013.01); *H04L 63/1441* (2013.01)

(58) Field of Classification Search
CPC . H04L 63/1416; H04L 63/1441; G06F 21/31; G06F 21/54; G06F 21/64
USPC .......................................................... 709/224
See application file for complete search history.

(56) References Cited

U.S. PATENT DOCUMENTS

| | | | | |
|---|---|---|---|---|
| 8,779,921 B1 * | 7/2014 | Curtiss | ................ | G08B 25/009 |
| | | | | 340/541 |
| 9,438,618 B1 * | 9/2016 | Sultan | ...................... | G06F 21/53 |
| 10,986,122 B2 * | 4/2021 | Bloxham | ................ | H04L 63/10 |
| 11,671,435 B2 * | 6/2023 | Sullivan | ................ | G06F 16/219 |
| | | | | 726/23 |
| 11,930,028 B2 * | 3/2024 | Lowry | ................ | H04L 63/1483 |

(Continued)

FOREIGN PATENT DOCUMENTS

WO  WO-2022087510 A1 *  4/2022  ............. G06F 21/34

OTHER PUBLICATIONS

"USPTO", Non-final Office Action for U.S. Appl. No. 18/300,672,, Jan. 24, 2025, 11 Pages.

(Continued)

*Primary Examiner* — Hamza N Algibhah
(74) *Attorney, Agent, or Firm* — IP Spring

(57) ABSTRACT

Various aspects related to methods, systems, and computer readable media for restricting processes being executed on a user device. A method can include, for example, receiving an indication of a security threat from a security threat indication service being executed by a user device, wherein the indication of the security threat has been initiated by the user, presenting, at the user device, one or more questions based on the indication of the security threat, receiving one or more responses to the one or more questions from the user, and, automatically remediating the security threat on the user device based upon the received one or more responses.

18 Claims, 10 Drawing Sheets

(56) References Cited

U.S. PATENT DOCUMENTS

| | | | |
|---|---|---|---|
| 12,039,607 B2* | 7/2024 | Feldman | G06Q 10/10 |
| 12,326,931 B2* | 6/2025 | El Rouby | G06F 21/552 |
| 2009/0165132 A1* | 6/2009 | Jain | G06F 21/554 726/22 |
| 2013/0097708 A1 | 4/2013 | Jayanthi et al. | |
| 2014/0283065 A1* | 9/2014 | Teddy | H04L 63/145 726/23 |
| 2014/0289853 A1* | 9/2014 | Teddy | G06F 21/566 726/23 |
| 2015/0244780 A1* | 8/2015 | Parashar | H04L 67/145 709/201 |
| 2015/0312266 A1* | 10/2015 | Thomas | H04L 65/1033 726/24 |
| 2015/0312267 A1* | 10/2015 | Thomas | H04L 63/0227 726/1 |
| 2016/0269434 A1* | 9/2016 | DiValentin | H04L 63/1441 |
| 2016/0357961 A1* | 12/2016 | Mulchandani | G06F 9/5038 |
| 2017/0034198 A1* | 2/2017 | Powers | H04L 63/1441 |
| 2017/0093897 A1 | 3/2017 | Cochin et al. | |
| 2017/0214679 A1* | 7/2017 | Lin | H04L 63/083 |
| 2017/0272462 A1 | 9/2017 | Kraemer | |
| 2017/0359370 A1* | 12/2017 | Humphries | G06F 21/6218 |
| 2018/0007014 A1* | 1/2018 | Neal | H04L 9/0822 |
| 2018/0039776 A1* | 2/2018 | Loman | G06F 21/566 |
| 2018/0041537 A1* | 2/2018 | Bloxham | H04L 63/0263 |
| 2018/0063181 A1* | 3/2018 | Jones | G06F 21/577 |
| 2018/0137401 A1* | 5/2018 | Kumar | G06F 16/245 |
| 2019/0014141 A1* | 1/2019 | Segal | H04L 63/1483 |
| 2019/0058992 A1* | 2/2019 | Kurian | H04W 12/06 |
| 2019/0081975 A1* | 3/2019 | Iaroshevych | H04L 63/1441 |
| 2019/0087569 A1* | 3/2019 | Levin | G06N 20/00 |
| 2019/0132358 A1* | 5/2019 | DiValentin | H04L 63/1416 |
| 2019/0260769 A1* | 8/2019 | Sharon | H04L 63/1416 |
| 2019/0260770 A1* | 8/2019 | Sansom | H04L 51/212 |
| 2020/0162485 A1* | 5/2020 | Jevans | H04L 63/0428 |
| 2020/0358798 A1* | 11/2020 | Maylor | H04L 63/1433 |
| 2020/0394305 A1* | 12/2020 | Cosgrove | G06F 21/56 |
| 2021/0021612 A1* | 1/2021 | Higbee | H04L 63/1416 |
| 2021/0058412 A1* | 2/2021 | Rowland | H04L 63/1416 |
| 2021/0067526 A1 | 3/2021 | Fahrny et al. | |
| 2021/0075828 A1* | 3/2021 | Kras | H04L 51/42 |
| 2021/0126944 A1* | 4/2021 | Lesperance | H04L 63/1433 |
| 2021/0211443 A1 | 7/2021 | Sullivan et al. | |
| 2022/0201022 A1* | 6/2022 | Singh | H04L 63/1425 |
| 2022/0300585 A1* | 9/2022 | Mudumba | G06F 18/217 |
| 2022/0360594 A1* | 11/2022 | Cosgrove | H04L 63/1416 |
| 2023/0016689 A1* | 1/2023 | Voltz | H04L 9/3247 |
| 2023/0054704 A1* | 2/2023 | Ghalaty | G06F 16/906 |
| 2023/0161900 A1* | 5/2023 | Boutros | G06F 3/0482 726/27 |
| 2023/0208871 A1* | 6/2023 | Yellapragada | G06N 3/045 726/25 |
| 2023/0336573 A1* | 10/2023 | Jones | H04L 63/1416 |
| 2024/0354407 A1* | 10/2024 | Braggs | H04L 63/14 |

OTHER PUBLICATIONS

"Final Office Action in U.S. Appl. No. 18/300,672", Jun. 5, 2025.
Non-Final Office Action in U.S. Appl. No. 18/300,672, Sep. 26, 2025, 18 pages.

* cited by examiner

SECURITY THREAT REMEDIATION FOR
NETWORK-ACCESSIBLE DEVICES

CROSS-REFERENCE TO RELATED APPLICATIONS

This application claims the benefit of priority to U.S. Provisional Application Ser. No. 63/331,300, filed on Apr. 15, 2022, entitled "RESTRICTED EXECUTION MODE FOR NETWORK-ACCESSIBLE DEVICES," and to U.S. Provisional Application Ser. No. 63/331,308, filed on Apr. 15, 2022, entitled "SECURITY THREAT REMEDIATION FOR NETWORK-ACCESSIBLE DEVICES," the entire contents of both applications are hereby incorporated by reference herein.

TECHNICAL FIELD

Embodiments relate generally to software threat management, and more particularly, to methods, systems, and computer readable media for security threat remediation for network-accessible devices.

BACKGROUND

With continually evolving computer security threats, there remains a need for automated, semi-automated, and manual techniques to quickly mitigate security threats.

SUMMARY

Implementations of this application relate to methods, systems, and computer readable media for implementing security threat indication and remediation for network-accessible devices.

In one aspect, a computer-implemented method is disclosed. The computer-implemented method comprises: receiving an indication of a security threat from a security threat indication service being executed on a user device associated with a user, wherein the indication of the security threat was initiated by the user; presenting, at the user device, one or more questions based on the indication of the security threat; receiving one or more responses to the one or more questions from the user; and automatically remediating the security threat on the user device based upon the received one or more responses.

In some implementations, the security threat indication service comprises: a graphical user interface (GUI) configured to display a selectable graphic element indicative of a perceived security threat; and a communication component configured to transmit the indication of the security threat to a centralized server executing a centralized security service.

In some implementations, the indication of a security threat includes one or more of: an automated message originating at the user device and routed to an administrator device associated with the user device; or an automated software ticket generated at the user device and transmitted to a centralized server executing a centralized security service.

In some implementations, the automated software ticket comprises a listing of processes executing on the user device at a time the indication of the security threat is received.

In some implementations, the computer-implemented method further comprises: responsive to automatically remediating the security threat, restarting at least a portion of the processes from the listing.

In some implementations, the one or more questions based on the indication of the security threat comprises questions specifying (or requesting the user to specify) whether the security threat is a real security threat or a false positive security threat.

In some implementations, the computer-implemented method further comprises: determining that the security threat is the real security threat; wherein automatically remediating the security threat on the user device comprises receiving, from an administrator device associated with the user device, a command to initiate a security software suite, wherein the security software suite is configured to remediate the real security threat responsive to the command and the received one or more responses.

In some implementations, the computer-implemented method further comprises: after remediating the security threat on the user device, rebooting the user device based on a command received from an administrator device associated with the user device, wherein the command utilizes a remote application programming interface (API) function exposed by the user device.

In some implementations, presenting the one or more questions related to the indication of the security threat comprises: executing an automated chatbot at the user device, wherein the automated chatbot is configured to present the one or more questions and receive the one or more responses from the user automatically.

In some implementations, presenting the one or more questions related to the indication of the security threat comprises: presenting a chat interface at the user device, wherein the chat interface comprises the one or more questions associated with the user device.

In some implementations, the computer-implemented method further comprises, responsive to receiving the indication of the security threat: determining a set of trusted processes being executed on the user device from a set of processes being executed on the user device; and receiving, from an administrator device associated with the user device, a command to terminate or suspend processes that are not in the set of trusted processes.

In some implementations, the set of trusted processes comprises processes that are identifiable as being directed by one or more trusted software installations at the user device.

In another aspect, a computer program product is disclosed. The computer program product has one or more non-transitory computer-readable media with instructions stored thereon that, responsive to execution by one or more processing devices, cause the one or more processing devices to perform operations comprising: providing, at a user device associated with a user, a security threat indication service; receiving an indication of a security threat from the security threat indication service, the indication of the security threat initiated by the user; presenting, at the user device, one or more questions based on the indication of the security threat; receiving one or more responses to the one or more questions from the user; and automatically remediating the security threat on the user device based upon the received one or more responses.

In some implementations, the security threat indication service comprises: a graphical user interface (GUI) configured to display a selectable graphic element indicative of a perceived security threat; and a communication component configured to transmit the indication of the security threat to a centralized server executing a centralized security service.

In some implementations, the indication of a security threat includes one or more of: an automated message originating at the user device and routed to an administrator device associated with the user device; or an automated software ticket generated at the user device and transmitted to a centralized server executing a centralized security service.

In some implementations, the one or more questions based on the indication of the security threat comprises questions specifying (or requesting the user to specify) whether the security threat is a real security threat or a false positive security threat.

In some implementations, the operations further comprise: determining that the security threat is the real security threat; wherein automatically remediating the security threat on the user device comprises receiving, from an administrator device associated with the user device, a command to initiate a security software suite, wherein the security software suite is configured to remediate the real security threat responsive to the command and the received one or more responses.

In some implementations, the operations further comprise: responsive to automatically remediating the security threat on the user device, rebooting the user device through a command from an administrator device associated with the user device, wherein the command utilizes a remote application programming interface (API) function exposed by the user device.

In some implementations, presenting the one or more questions related to the indication of the security threat comprises: executing an automated chatbot at the user device, wherein the automated chatbot is configured to present the one or more questions and receive the one or more responses from the user.

In yet another aspect, a threat management computer system for managing active security threats on an enterprise network is disclosed. The threat management computer system comprises: one or more non-transitory, computer-readable media with instructions stored thereon; one or more processing devices, in communication with the one or more non-transitory, computer-readable media, wherein the one or more processing devices are configured to execute the instructions; and one or more network devices in communication with the one or more processing devices and configured to receive indications of security threats from a plurality of user devices, wherein the instructions cause the one or more processing devices to perform operations including: receiving an indication of a security threat from a security threat indication service being executed by a user device, wherein the indication of the security threat has been initiated by the user; presenting, at the user device, one or more questions based on the indication of the security threat; receiving one or more responses to the one or more questions from the user; and automatically remediating the security threat on the user device based upon the received one or more responses.

DETAILED DESCRIPTION

Figure 1:
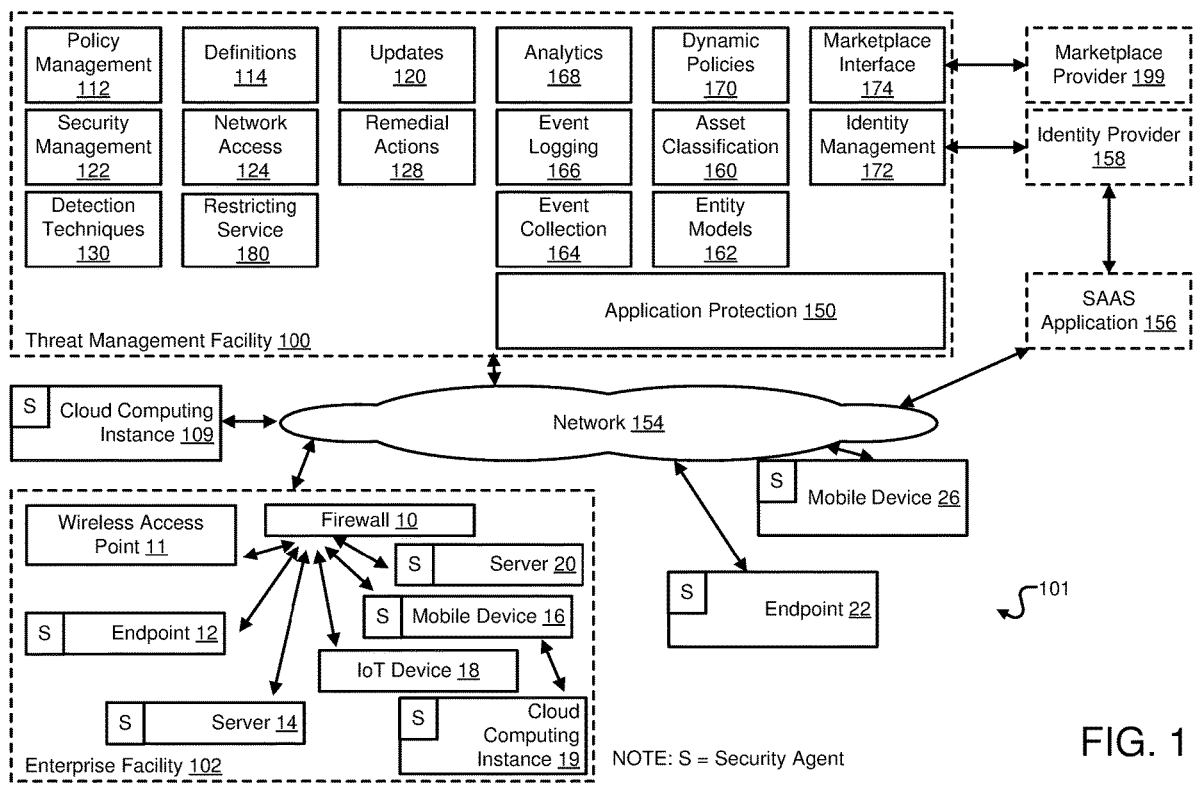
FIG. 1 is a diagram of an example enterprise network threat management system, in accordance with some implementations.

One or more implementations described herein relate to mitigating security threats to a user device, based on indications of security threats being received for the user device. Generally, computer networks may allow access by client devices such as user devices and/or other computer devices. These devices may include security software that is managed centrally, for example, through a centralized server or other service. However, network administrators or security management tools may generally rely on analysis and other tools to determine a threat status of personal devices, user devices, and other endpoints.

For example, in a given computer network, there may be managed and unmanaged endpoints on the network. Managed endpoints may have security software that is administered by the network administrators, and may have an agent (e.g., security agent, administrative agent, or other security software) that can report the security status of the endpoint. An administrator that wants to determine the security status of a managed endpoint may be able to access a management console on premise at the enterprise or in the cloud to determine the status of a given endpoint or to see a report of the security status (e.g., security state) of a given endpoint. The security status can include, for example, whether a given endpoint has a security agent running, whether the security agent has the latest updates, and whether activity on the endpoint indicates a security threat.

In some cases, even if a given endpoint is managed, some endpoints on a network may still undergo security threats. While under an active security threat and/or if an indication of security threat is received for a particular endpoint, network administrators must appropriately remediate the threat such that the integrity of the endpoint as well as the computer network is maintained. However, users of the devices may be valuable resources in determining if a potential security threat exists, prior to an actual security threat being detectable. For example, some users may be aware of various malicious campaigns in existence through corporate messaging and memorandums, news articles, social media, and other data regarding existing and potential security threats.

As users become aware of potential security threats, some users may still inadvertently engage in activity that exposes a computer device to a potential security threat. The users may, in some cases, access a malicious website, download a malicious file, provide information in response to a phishing campaign, click or access links in a spear-phishing campaign, access unapproved websites or unfamiliar websites, or perform other actions that can potentially pose security threats to the device and/or the network. However, the users oftentimes may become immediately aware that their actions may be harmful. For example, a user may notice initial activity associated with a malware installation (e.g., slowdown of a computer, or an installation window opening, etc.), may become apprehensive at a malfunctioning link provided in a spear-phishing or phishing campaign, or may otherwise become initially aware that the actions are associated with malicious software. In these and other scenarios, a user may attempt to contact a network administrator—which sometimes may be a difficult user experience—or may otherwise make attempts to remediate the impact of their actions while further exposing the computer device and associated networks to more threats.

The below detailed description is presented in reference to these and other scenarios where computer networks, network administrators, and users can benefit from the flagging of potential security threats immediately, by the users who inadvertently engage in actions that expose a computer device to a security threat, through user interfaces provided at a user device and a network administrator console.

FIG. 1 depicts a block diagram of a threat management system 101 providing protection against a plurality of threats, such as malware, viruses, spyware, cryptoware, adware, ransomware, trojans, spam, intrusion, policy abuse, improper configuration, vulnerabilities, improper access, uncontrolled access, and more. A threat management facility or network monitor 100 may communicate with, coordinate, and control operation of security functionality at different control points, layers, and levels within the system 101. A number of capabilities may be provided by the threat management facility 100, with an overall goal to intelligently monitor endpoints/hosts, associated computing activity, and receive indications of potential security threats from users utilizing the endpoints. The threat management facility 100 can also monitor network traffic passively and analyze the traffic to determine some security statuses. The threat management facility 100 may be or may include a gateway such as a web security appliance that is actively routing and/or assessing the network requests for security purposes. Another overall goal is to provide protection needed by an organization that is dynamic and able to adapt to changes in compute instances and new threats by engaging in direct communication with users utilizing endpoints, at an early stage, to limit network exposure to security threats based on user-flagged potential security threats. According to various aspects, the threat management facility 100 may provide protection from a variety of threats to a variety of compute instances in a variety of locations and network configurations.

As one example, users of the threat management facility 100 may define and enforce policies that control access to and use of compute instances, networks, and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications, and data available from servers, applications, and data permitted to be accessed by endpoints, and network resources and data permitted to be run and used by endpoints. The threat management facility 100 may provide many different services, and policy management may be offered as one of the services.

Turning to a description of certain capabilities and components of the threat management system 100, an example enterprise facility 102 may be or may include any networked computer-based infrastructure. For example, the enterprise facility 102 may be corporate, commercial, organizational, educational, governmental, or the like. As home networks can also include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown as one example, and it will be understood that there may be any number of compute instances, less or more of each type of compute instances, and other types of compute instances.

As shown, the example enterprise facility includes a firewall 10, a wireless access point 11, an endpoint 12, a server 14, a mobile device 16, an appliance or Internet-of-Things (IoT) device 18, a cloud computing instance 19, and a server 20. One or more of 10-20 may be implemented in hardware (e.g., a hardware firewall, a hardware wireless access point, a hardware mobile device, a hardware IoT device, a hardware etc.) or in software (e.g., a virtual machine configured as a server or firewall or mobile device). While FIG. 1 shows various elements 10-20, these are for example only, and there may be any number or types of elements in a given enterprise facility. For example, in addition to the elements depicted in the enterprise facility 102, there may be one or more gateways, bridges, wired networks, wireless networks, virtual private networks, virtual machines or compute instances, computers, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, marketplace management facility 174, and at least one restricting service 180, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In various implementations, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122. According to some implementations, the marketplace provider 199 is a trusted security vendor that can provide one or more security software products to any of the compute instances described herein. In this manner, the marketplace provider 199 may include a plurality of trusted security vendors that are used by one or more of the illustrated compute instances.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

The identity provider 158 may provide user identity information, such as multi-factor authentication, to a software-as-a-service (SaaS) application. Centralized identity providers may be used by an enterprise facility instead of maintaining separate identity information for each application or group of applications, and as a centralized point for integrating multifactor authentication. The identity management facility 172 may communicate hygiene, or security risk information, to the identity provider 158. The identity management facility 172 may determine a risk score for a particular user based on events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

The threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as SaaS application 156. The SaaS application 156 may be an application that is used by but not operated by the enterprise facility 102. Example commercially available SaaS applications 156 include Salesforce, Amazon Web Services (AWS) applications, Google Apps applications, Microsoft Office 365 applications, and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

Aspects of the threat management facility 100 may be provided as a stand-alone solution. In other implementations, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In some implementations, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an implementation, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an implementation, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

According to one implementation, the security management facility 122 may provide for network monitoring and access control, which generally controls access to and use of network connections. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. According to various implementations, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

The security management facility 122 may also provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

The security management facility 122 may provide also for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In some implementations, some reputation information may be stored on a compute instance 10-26, and other reputation data available through cloud lookups to an application protection lookup database, such as may be provided by application protection 150.

According to some implementations, the security management facility 122 may also provide for direct communication with users of particular endpoints based on user-initiated flags of potential security threats, as described herein. For example, a user accessing an endpoint (such as a client or user device 22, 26) may flag the particular endpoint as being potentially exposed to a security threat. The user may receive a direct communication in response to the flag, such as, for example, a chat window, automated chatbot, or other communication service. Responsive to the user's communications with the direct communication, the nature of the potential security threat may be ascertained and (if it is a real security threat) remediated. Aspects of flagging potential security threats may be provided, for example, through the restricting service 180, security agent of an endpoint 12, an interface served by a wireless access point 11 or firewall 10, as part of application protection 150 provided by the cloud, and so on. Other portions of the threat management facility 100 may also provide functionality associated with flagging potential security threats, engaging in direct communication to ascertain the potential security threat, and other functionality.

In some implementations, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. Feedback may enable the evaluation or profiling of client actions that are violations of policy that may provide a predictive model for the improvement of enterprise policies as well as detection of emerging security threats.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In some implementations, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Example rules include access permissions associated with networks, applications, compute instances, users, content, data, and the like. The policy management facility 112 may use a database, a text file, other data store, or a combination to store policies. A policy database may include a block list, a black list, an allowed list, a white list, and more. As non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Example policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In one implementation, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

The threat management facility 100 may provide configuration management as an aspect of the policy management facility 112, the security management facility 122, or a combination thereof. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

The policy management facility 112 may also require update management (e.g., as provided by the update facility 120). Update management for the security facility 122 and policy management facility 112 may be provided directly by the threat management facility 100, or, for example, by a hosted system. In some implementations, the threat management facility 100 may also provide for patch management, where a patch may be an update to an operating system, an application, a system tool, or the like, where one of the reasons for the patch is to reduce vulnerability to threats.

In some implementations, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In one implementation, the policy management facility 112 and the security facility 122 may work in concert with the update management facility 120 to provide information to the enterprise facility's 102 network and/or compute instances 10-26. In various implementations, policy updates, security updates, and other updates may be provided by the same or different modules, which may be the same or separate from a security agent running on one of the compute instances 10-26. Furthermore, the policy updates, security updates, and other updates may be monitored through network traffic to determine if endpoints or compute instances 10-26 correctly receive the associated updates.

As threats are identified and characterized, the definition facility 114 of the threat management facility 100 may manage definitions used to detect and remediate threats. For example, identity definitions may be used for recognizing features of known or potentially malicious code and/or known or potentially malicious network activity. Definitions also may include, for example, code or data to be used in a classifier, such as a neural network or other classifier that may be trained using machine learning. Updated code or data may be used by the classifier to classify threats. In some implementations, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need-to-know data, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In some implementations, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An example event may be communication of a specific packet over the network. Another example event may be identification of an application that is communicating over a network. These and other events may be used to determine that a particular endpoint includes or does not include actively updated security software from a trusted vendor.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility 122. Observations or inferences about events may also be logged by the event logging facility 166.

When a threat or other policy violation is detected by the security management facility 122, the remedial action facility 128 may be used to remediate the threat. Remedial action may take a variety of forms, including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

In at least one implementation, when a threat or other policy violation is detected by the security management facility 122 or another facility, the restricting service 180 may be used to implement a restricted execution mode at one or more client devices based on the threat or policy violation. The restricting service 180 may also be configured to assist in implementation threat mitigation techniques handled by the security management facility 122.

With regard to restricted execution modes, several modes may be implemented through and/or by the restricting service 180. For example, the restricted execution mode may be a safe operating mode whereby an endpoint (such as a client or user device 22, 26) has at least a portion of suspected malicious processes terminated (or suspended) until a security threat is remediated. Aspects of restricted execution modes may be provided, for example, through the restricting service 180, in the security agent of an endpoint 12, in a wireless access point 11 or firewall 10, as part of application protection 150 provided by the cloud, and so on. Restricted execution modes may also include automatic threat identification, placing endpoints in said restricted execution modes, remediation of identified threats, and rebooting/resuming execution in a regular mode. In some implementations, a security agent on the endpoint, alone or together with the restricting service 180 and/or the threat management facility 100 and/or security management facility 122, carries out this function. For this reason, the security agent of the endpoint may be configured with highest privileges (e.g., root) on the endpoint. Other portions of the threat management facility 100 may also provide restricted execution mode functionality.

Figure 2:
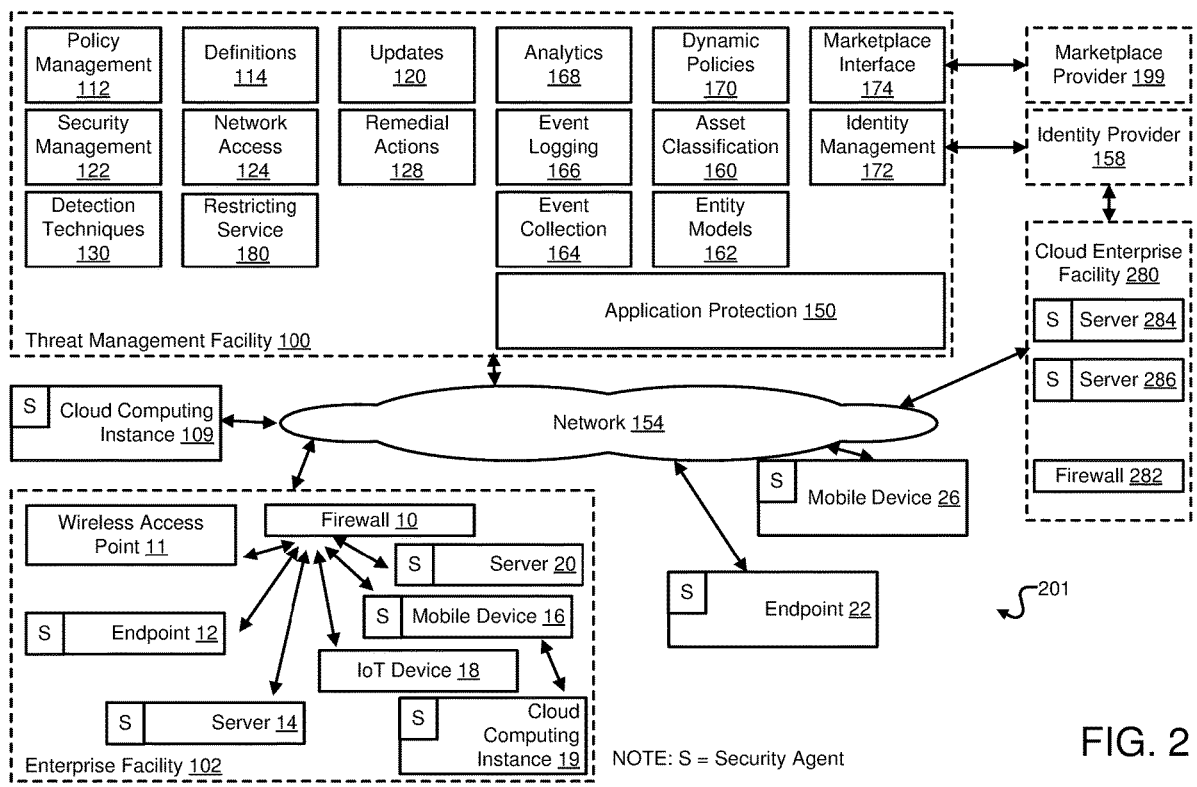
FIG. 2 is a diagram of an example enterprise network threat management system, in accordance with some implementations.

FIG. 2 depicts a diagram of a threat management system 201 such as any of the threat management systems described herein, and additionally including a cloud enterprise facility 280. Generally, systems 101 and 201 are similar; therefore, superfluous description of like elements is omitted herein for the sake of brevity and clarity of disclosure.

The cloud enterprise facility 280 of system 201 may include servers 284, 286, and a firewall 282. The servers 284, 286 on the cloud enterprise facility 280 may run one or more enterprise applications and make them available to the compute instances 10-26 of enterprise facility 102. It should be understood that there may be any number of servers 284, 286 and firewalls 282, as well as other compute instances in a given cloud enterprise facility 280. It also should be understood that a given enterprise facility may use either or both of SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

Figure 3:
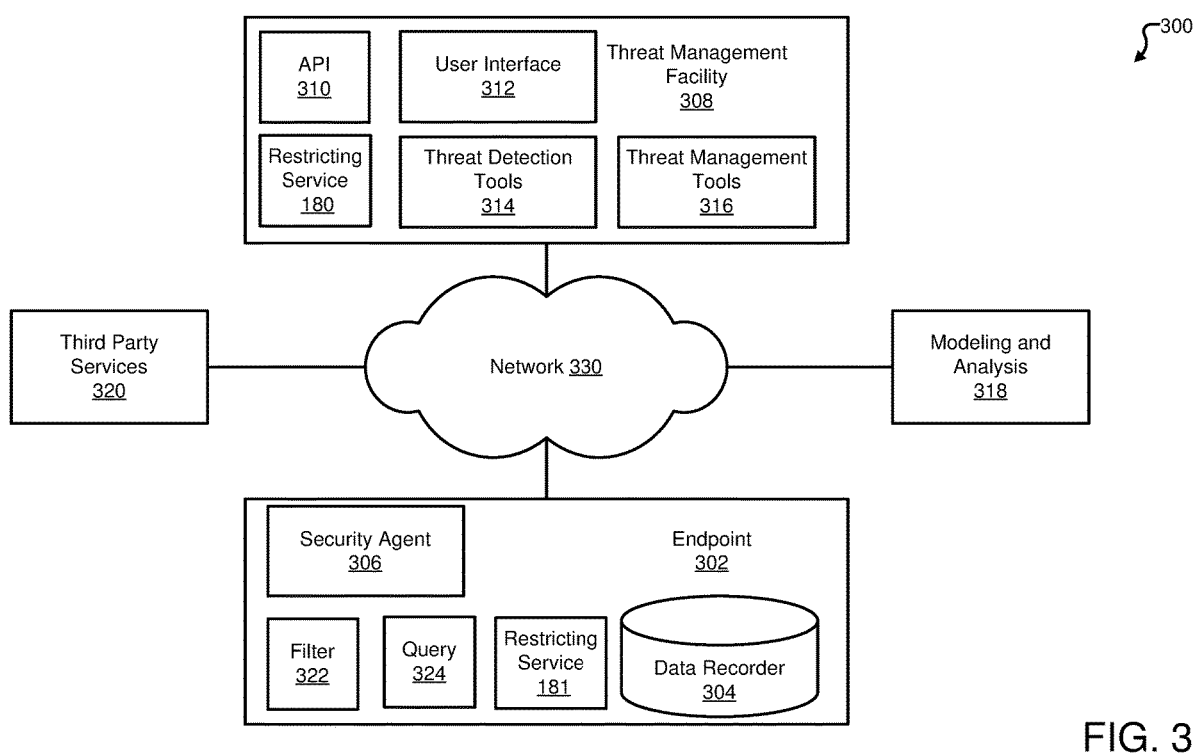
FIG. 3 is a schematic of an example enterprise network threat management system, in accordance with some implementations.

FIG. 3 shows a system 300 for enterprise network threat detection. System 300 may include one or more endpoints, e.g., endpoint 302; a threat management facility 308 (e.g., similar to facility 100 of FIGS. 1 and 2); a modeling and analysis platform 318; and one or more third party services 320 (hosted on third party computing devices, all coupled via network 330. The system 300 may use any of the various tools and techniques for threat management described herein.

Endpoints such as the endpoint 302 may include a data recorder 304, a security agent 306, a filter 322, and may store a query 324. The endpoint 302 may log events in a data recorder 304, e.g., a database or other storage. A local agent on the endpoint 302 such as the security agent 306 may filter this data and feed a filtered data stream to a threat management facility 308 such as a central threat management facility or any of the other threat management facilities described herein.

The threat management facility 308 can include an API 310, a user interface 312, threat detection tools 314, threat management tools 316, and the restricting service 180. The threat management facility 308 can locally or globally tune filtering by local agents based on the current data stream, and can query local event data recorders for additional information where necessary or helpful in threat detection or forensic analysis. The threat management facility 308 may also (or alternatively) store and deploy a number of security tools such as a web-based user interface that is supported by machine learning models to aid in the identification and assessment of potential threats by a human user. This may, for example, include machine learning analysis of network traffic, models to provide human-readable context for evaluating potential threats, and any of the other tools or techniques described herein. More generally, the threat management facility 308 may include one or more of a variety of threat management tools 316 to aid in the detection, evaluation, and remediation of threats or potential threats.

The threat management facility 308 may perform a range of threat management functions such as any of those described herein. In some implementations, the threat management facility 308 may provide an application programming interface 310 for third party services 320 from trusted security vendors, a user interface 312 for access to threat management, flagging potential security threats, and network administration functions, and one or more threat detection tools 314.

In general, the application programming interface 310 may support programmatic connections with third party services 320 that facilitate exchange of data between threat management facility 308 and third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for potential threat flagging, threat detection, network administration, audit, configuration and so forth. This user interface 312 may generally facilitate curation of potential threats, e.g., by presenting threats along with other supplemental information, and providing controls for a user to dispose of such threats as desired, e.g., by permitting execution or access, by denying execution or access, or by engaging in remedial measures such as restricted execution modes, sandboxing, quarantining, vaccinating, and so forth.

The threat detection tools 314 may include any of the threat detection tools, algorithms, or techniques described herein, or any other tools for detecting threats or potential threats within an enterprise network. This may, for example, include network behavioral tools, machine learning models, and so forth. In general, the threat detection tools 314 may use network traffic data caused by endpoints within the enterprise network, as well as any other available context such as heartbeats, to detect malicious software or potentially unsafe conditions for a network or endpoints connected to the network. In one aspect, the threat detection tools 314 may usefully monitor network activity data from a number of endpoints (including, e.g., network components such as gateways, routers and firewalls) for improved threat detection in the context of complex or distributed threats. The threat detection tools 314 may also or instead include tools for reporting to a separate modeling and analysis platform 318, e.g., to support further investigation of security issues, creation or refinement of security status detection models or algorithms, review, and analysis of security breaches and so forth.

The threat management tools 316 may generally be used to manage or remediate threats to the enterprise network that have been identified with the threat detection tools 314 or otherwise. Threat management tools 316 may, for example, include tools for restricted execution modes (alone or in unison with the restricting service 180), sandboxing, quarantining, removing, or otherwise remediating or managing malicious code or malicious activity, e.g., using any of the techniques described herein.

The endpoint 302 may be any of the endpoints or other compute instances described herein. This may, for example, include end-user computing devices, mobile devices, firewalls, gateways, servers, routers, and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The endpoint 302 may also include a local restricting service 181 in operative communication with the security agent 306. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302. The security agent 306 may also, for example, provide functions for flagging potential security threats, communicating with network administrators and/or automated chatbots, and other functionality associated with ascertaining a nature of a potential security threat and remediation functions.

Additionally, as described herein, endpoints having an indication of security threat may also be identified through the threat detection tools 314. For example, the threat detection tools 314 may identify suspicious network activity, suspicious processes, untrusted processes, and other identifiers for these devices. Under these circumstances, the endpoints may be determined to be more likely to warrant further review and/or remediation by a network administrator. In these examples, the network administrator may direct a user of the suspicious endpoint to enter additional information in a chat interface to aid in remediating the security threat. In some implementations, a remote network device or, in some circumstances the network administrator, may direct the suspicious endpoint to enter a restricted execution mode to aid in remediating the security threat. Upon direction to enter a restricted execution mode, the local restricting service 181 may perform one or more local methods on the endpoint 302 to effectuate entering the restricted execution mode.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network and the like. The level of reporting may also or instead be based on currently available network and computing resources, or any other appropriate context.

In another aspect, the endpoint 302 may include a query interface 324 so that remote resources such as the threat management facility 308 can query the data recorder 304 for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parameterized request for activities monitored by the data recorder 304. In another aspect, the entire data log, or the entire log over some predetermined window of time, may be requested for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. The threat management facility may be configured to receive the filtered event stream from the endpoint, compare this event stream to activity amongst other endpoints, and recommend review of endpoints where inconsistencies in operation or indications of security threats exist. Additionally, the threat management facility can effectuate remediation of endpoints when suspicious activity is detected through requesting additional information directly from a user of the endpoint, and responsive to the additional information, remediate the threat(s) with reduced interruption to productivity, efficiency, and other technical benefits.

Figure 4:
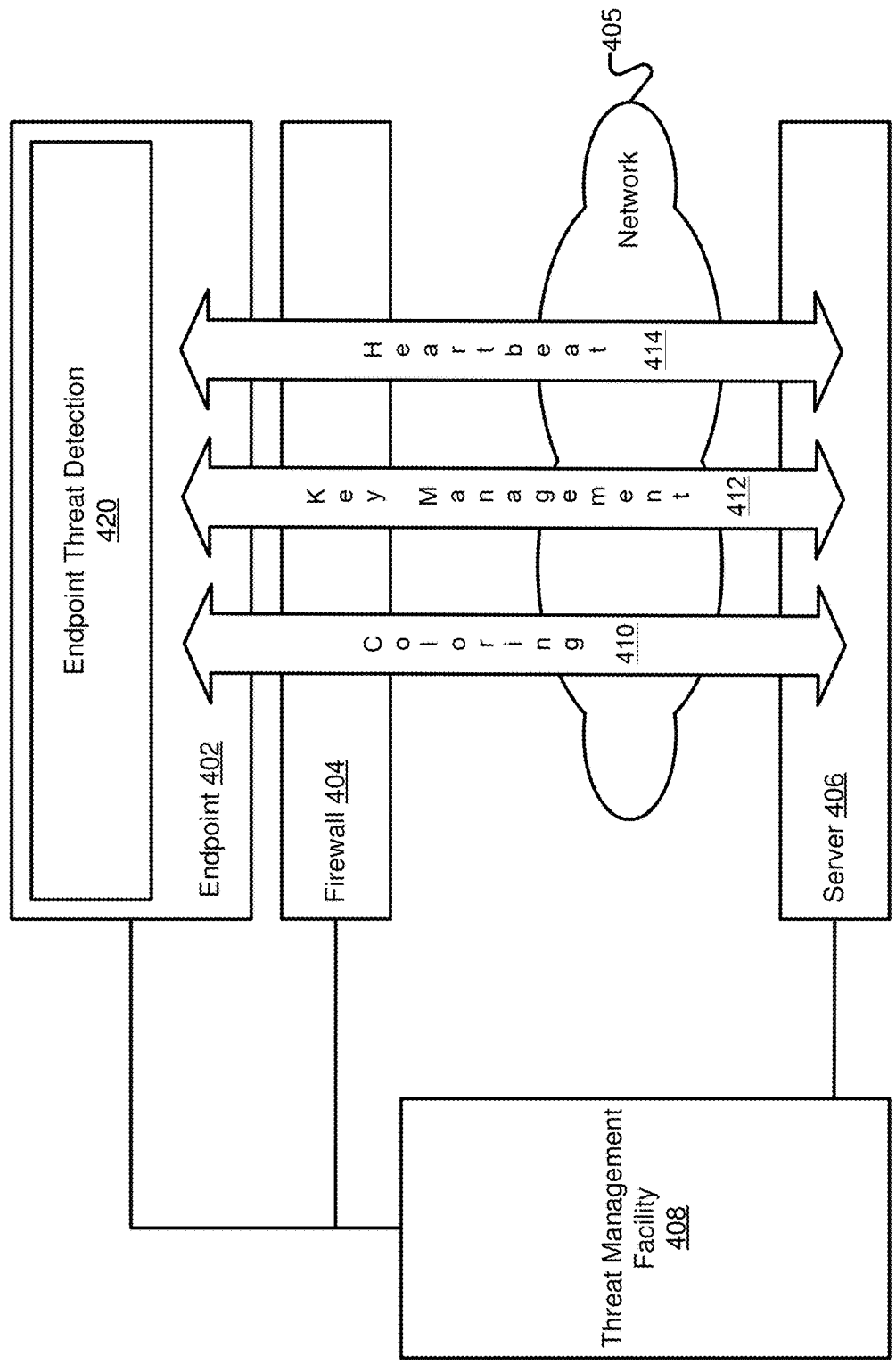
FIG. 4 is a block diagram of an example enterprise network threat management system, in accordance with some implementations.

FIG. 4 is a block diagram of an enterprise network threat management system. In general, the system may include an endpoint 402, a firewall 404, a server 406, and a threat management facility 408 coupled to one another directly or indirectly through a data network 405. Each of the entities depicted in FIG. 4 may, for example, be implemented on one or more computing devices such as the computing device described herein. A number of systems may be distributed across these various components to support threat detection, such as a coloring system 410, a key management system 412, and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information. In particular, the coloring system 410 may, for example, identify trusted processes from a corpus of processes executing at endpoint 402.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted or otherwise modified. More generally, the cooperation of these systems enables a wide variety of reactive measures that can improve detection and remediation of potential threats to an endpoint.

Figure 5:
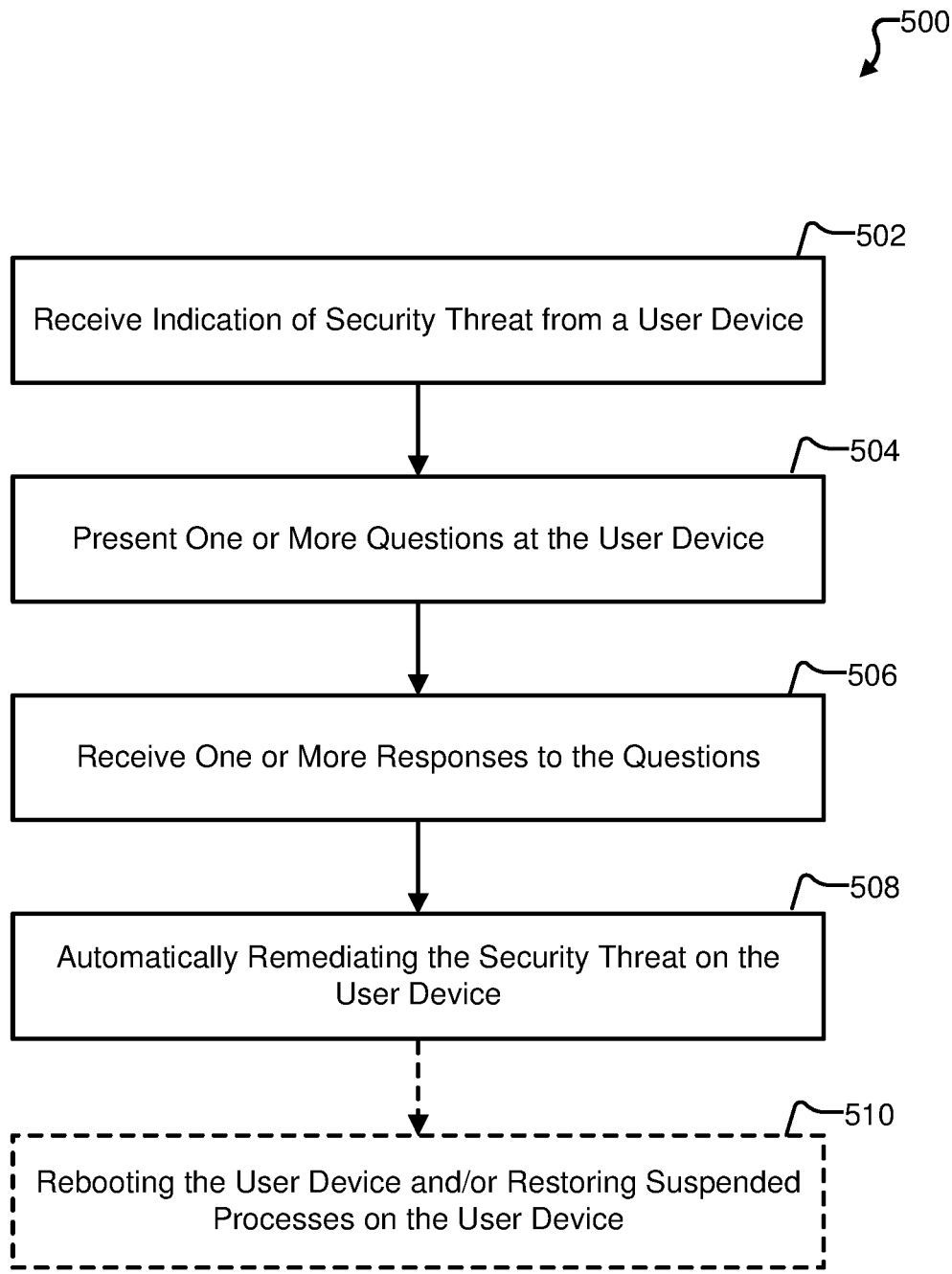
FIG. 5 is a flow diagram of an example method of security threat indication for network-accessible devices, in accordance with some implementations.

FIG. 5 shows is a flow diagram of an example method 500 of security threat indication and remediation for network-accessible devices. The method 500 may be implemented by one or more of the devices and/or systems illustrated in FIGS. 1-4 and is discussed by way of reference thereto. For example, the method 500 may be executed by a remote device, a threat management facility, a security agent executing on a user device, or any of the foregoing computing devices that may be in operative communication with the user device.

In general, various detection techniques are used to identify potential threats. For example, machine learning techniques may be used to evaluate suspiciousness based on activity related to a monitored endpoint. Additionally, any of the threat management facilities and sub-components may monitor endpoints for potential indications of security threats. Additionally, users may also flag potential security events, security threats, and other activity, to a centralized threat management facility (e.g., 100). Based upon receipt of an indication of a security threat transmitted by a user, a network administrator may direct an automated chatbot to retrieve additional information from the user, may directly communicate with the user to retrieve additional information, or may direct security software on the user device to scan, detect, and/or remediate the potential security threat. By receiving early indications of security threats directly from users, automated threat mitigation actions can be performed and/or human threat intervention can advantageously be directed toward contexts most appropriate for non-automated responses. Furthermore, with these mitigation actions occurring early in the process of security threat identification, productivity may be increased and user engagement with security tools may be improved.

Method 500 may begin at block 502. At block 502, an indication of security threat may be received for one or more user devices on a network. Generally, some user devices may have security software and/or a security threat indication service installed thereon and configured to identify the security threats. The security software and/or security threat indication service may also provide a user interface allowing for the flagging of potentially harmful activities and/or potential security threats. The flagging may be facilitated through a button, prompt, and/or other graphical user interface (GUI) element. For example, the security threat indication service may include, at least, a GUI configured to display a selectable graphic element indicative of a perceived security threat and a communication component configured to transmit the indication of the security threat to a centralized server executing a centralized security service.

The indication of a security threat may be transmitted to a centralized threat management facility (e.g., 100), network administrator console, or otherwise be communicated to one or more network administrators and/or remote devices by the security threat indication service. In this manner, the indication of security threat is initiated by a user and may be received from security software that executes on the user device. In some implementations, the indication of security threat includes an automated message originating at the user device and routed to an administrator device associated with the user device. The indication of security threat may also include an automated software ticket generated at the user device and transmitted to a centralized server executing a centralized security service. For example, the automated software ticket may include a listing of processes executing on the user device at a time the indication of the security threat is received. The listing of processes may be used to identify a nature of the security threat, and/or aid in remediating the user device. In some implementations, the listing of processes may be provided by the restricting service 180 and/or the local restricting service 181.

In some implementations, the indication of security threat may initiate an automated threat mitigation tool, such as a security agent executing on the user device, to isolate, sandbox, and/or otherwise restrict the user device. In some implementations, automatically restricting the user device may include determining a set of trusted processes being executed on the user device from a set of processes being executed on the user device, and receiving a command to terminate or suspend processes that are not in the set of trusted processes, by the restricting service 180 or the local restricting service 181. The set of trusted processes may include processes that are identified as being directed by one or more trusted software installations at the user device. By terminating or suspending these processes in an early or automated manner, the user device may be restricted from allowing the potential security threat to cause additional damage or executing malicious code. Upon entering the restricted execution mode, the restricting service 180 or 181 may indicate to the security threat indication service that the device is presently in the restricted execution mode.

In some implementations, the receipt of the indication of security threat may initiate other remedial actions. The other remedial actions may include, for example, instructing the security agent to initiate actions on the user device that can prevent further damage by the threat and assist with remediation. For example, in some implementations, the indication of security threat may initiate the device being placed in a restricted execution mode by suspending or terminating processes that are running and, for example, allowing only trusted processes and/or software to execute (e.g., the operating system and/or security software) through use of one or more restricting services (e.g., 180 or 181). For example, the indication of security threat may initiate restrictions of processes that are permitted to run on the device, by for example, limiting processes to trusted (e.g., signed and/or otherwise identified as trusted) processes from certain vendors. Other processes may be suspended or terminated, or have restricted access permissions. The restricted execution mode may include restriction of network activity to networks or network connections that can be used for communication with the user and for remediation.

In addition, the indication of security threat may also initiate actions on other devices, such as switches, firewalls, and gateways to restrict network traffic to and from the device that triggered the indication of security threat. The indication of a security threat may cause the security agent to initiate an automatic scanning of memory and storage devices for suspicious artifacts and activity. The indication of security threat may restrict access to, or modifications of, storage devices, both on and off the user device. The indication of the security threat may reduce permissions of the user raising the indication of security threat. The indication of security threat may terminate permissions of the user raising the indication of security threat on any other devices where the user's account is active. For example, the indication of security threat may terminate any active authentication tokens. The indication of security threat may initiate storage or transfer of log and activity files to enable investigation or remediation. The indication of security threat may also initiate automated action(s) to remediate the user device while performing other features of the method. The method continues at block 504.

At block 504, one or more questions may be presented at the user device through a user interface provided by the security threat indication service. The one or more questions may be presented based upon the indication of the security threat. For example, the one or more questions based on the indication of the security threat may include questions requesting the user to specify whether the security threat is a real security threat or a false positive security threat. In some implementations, the one or more questions may be posed by an automated chatbot through a chat interface in an automated manner. In another implementation, the one or more questions may be posed by a network administrator through a chat interface. The one or more questions may include: requests for identification of the potentially malicious activity, requests for a description of events surrounding the indication of security threat, requests for a copy of an email or text communication, requests for a copy of a malicious link or malicious website, and/or other suitable questions and requests.

The method continues at block 506.

At block 506, one or more responses to the one or more questions are received from the user of the user device at a threat management facility. The one or more responses may include, for example, identification of the potentially malicious activity, a description of events surrounding the indication of security threat, a copy of an email or text communication, a copy of a malicious link or malicious website, and/or other suitable responses. Block 506 may be followed by block 508.

At block 508, the potential security threat on the user device may be remediated by a local security agent executing on the user device. In some circumstances, the indication of security threat may not be associated with a real security threat, but instead be initiated by a user being overly cautious about a false positive security threat. In these scenarios, the remediating may include presenting a message in the GUI indicating that the threat was successfully remediated, that the threat was not a real security threat, or otherwise indicating to the user that the user device has no further active real security threats.

In scenarios where the indication of security threat is based upon a real security threat, a network administrator device may issue a command to determine if the threat is a real security threat and/or remediate the real security threat.

For example, a security agent on the user device may be directed to remediate the threat causing the indication of security threat on the user device. The security agent, during the remediating, may suspend or terminate processes based on the remediating, for example, by directing the restricting service 180 or 181 to suspend or terminate processes. In these scenarios, malicious activity within one or more trusted processes can be identified and the associated processes suspended or terminated accordingly.

In some implementations, a remote device may direct security software (or the security agent) on the user device to initiate the remediation process. The remote device may monitor progress of the remediation, cause updates to a security status of the user device based on the remediation, and so on. For example, a user interface may be provided to display indications of threats, as well as functional controls for directing various endpoints to enter restricted execution modes and remediate the security threats. Upon remediation of the security threat, the restricted execution mode or other isolation sandboxing may be lifted such that new processes may be initiated at the user device. The lifting may be facilitated by either the restricting service 180 and/or the local restricting service 181. For example, block 508 may optionally be followed by block 510.

At block 510, suspended or terminated processes may be restarted at the user device by the restricting service 180 or the local restricting service 181. Alternatively, the user device may be rebooted at block 510. Furthermore, if a saved execution state of the user device is available, the saved execution state may be reinitialized at the user device, without the compromised processes affected by the remediating, for example by rebooting into the saved execution state and/or restarting a portion of suspended processes unaffected by the remediating. For example, rebooting the user device may be facilitated through a command from an administrator device associated with the user device, wherein the command utilizes a remote application programming interface (API) function exposed by the user device As described herein, a system for computer assisted remediation of security threats may include a memory storing security software configured to receive indications of security threats from users of user devices. The system may also include a threat management facility configured to apply a security status detection model to identify emerging security threats. The system may also include an interface configured to display indications of threats for a plurality of endpoints, and provide chat interfaces for receiving additional information related to user-flagged security threats. The interface may also be configured to present additional contextual information (e.g., based on potential threats, disk activity, network activity, etc.) to a user or network administrator through the user interface. The interface may also be configured to allow remedial actions such as quarantining or revocation of network access.

Turning now to the various views of FIG. 6, a user interface 600 for indication of security threats from user devices is illustrated.

Figure 6A:
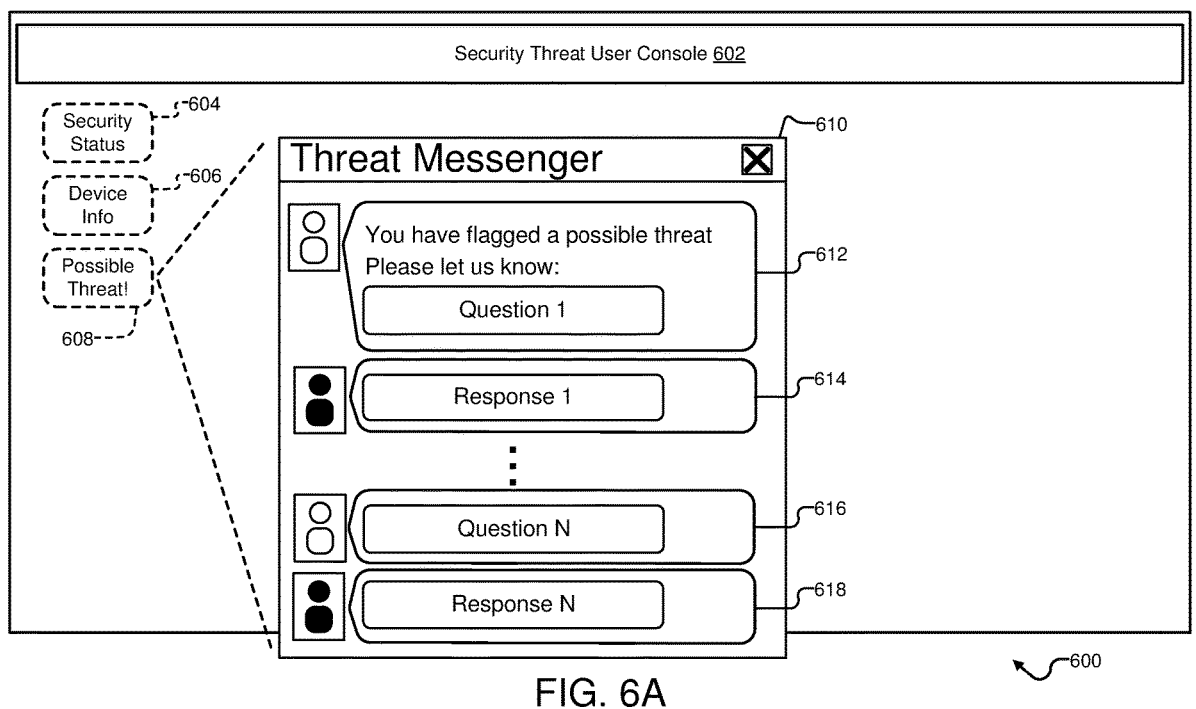
FIG. 6A is a diagram of an example user interface for indication of security threats from user devices, in accordance with some implementations.

As shown in FIG. 6A, the user interface 600 includes a security threat indication service console 602 configured to present information to a user of a user device. A security status information element 604 may direct the console 602 to provide security software information to a user. A device information element 606 may direct the console 602 to provide device information to the user. Furthermore, a security threat indication element 608 may allow a user to indicate a potential security threat.

Upon indication of a security threat through the element 608, a chat interface 610 may be presented to the user. It is noted that in addition to presentation of the chat interface 610, other actions may be performed, such as those actions described above with reference to FIG. 5. For example, the user device may be placed into a restricted execution mode where all non-trusted processes are terminated and/or suspended. Furthermore, a security agent may be directed to retrieve and identify malicious activity, perform scanning, alert other endpoints of the potential threat, and so on.

Upon presentation of the chat interface 610, an automated chatbot and/or a network administrator may present one or more questions 612 and 616 to the user. The user may submit one or more responses 614 and 618 to the one or more questions that are transmitted to a network administrator device.

Figure 6B:
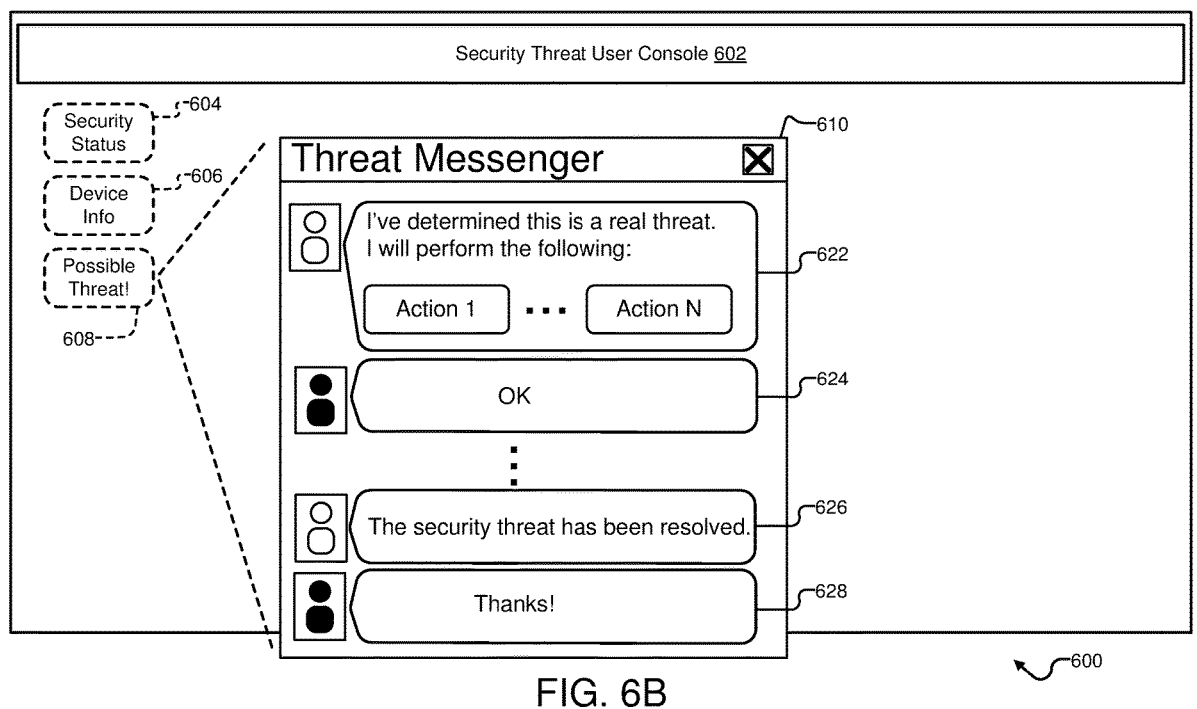
FIG. 6B is a diagram of an example user interface for indication of security threats from user devices, in accordance with some implementations.

Depending upon the one or more responses and other activity (e.g., scanning memory, hard drives, and other detection activity), the network administrator and/or automated chatbot may determine that the potential security threat is a real security threat. Accordingly, as shown in FIG. 6B, the chat interface 610 may be used to present one or more remedial actions 1 through N, shown in element 622, that inform the user with information related to remediation activity. It is noted that even if the security threat is not found to be credible, the network administrator and/or chatbot may still inform the user that remedial actions were taken, for example, by letting the user know that the security threat has been resolved (e.g., 626). The chat interface 610 may allow the user to interact (e.g., 624, 628) regularly during remediation to increase user engagement.

Figure 6C:
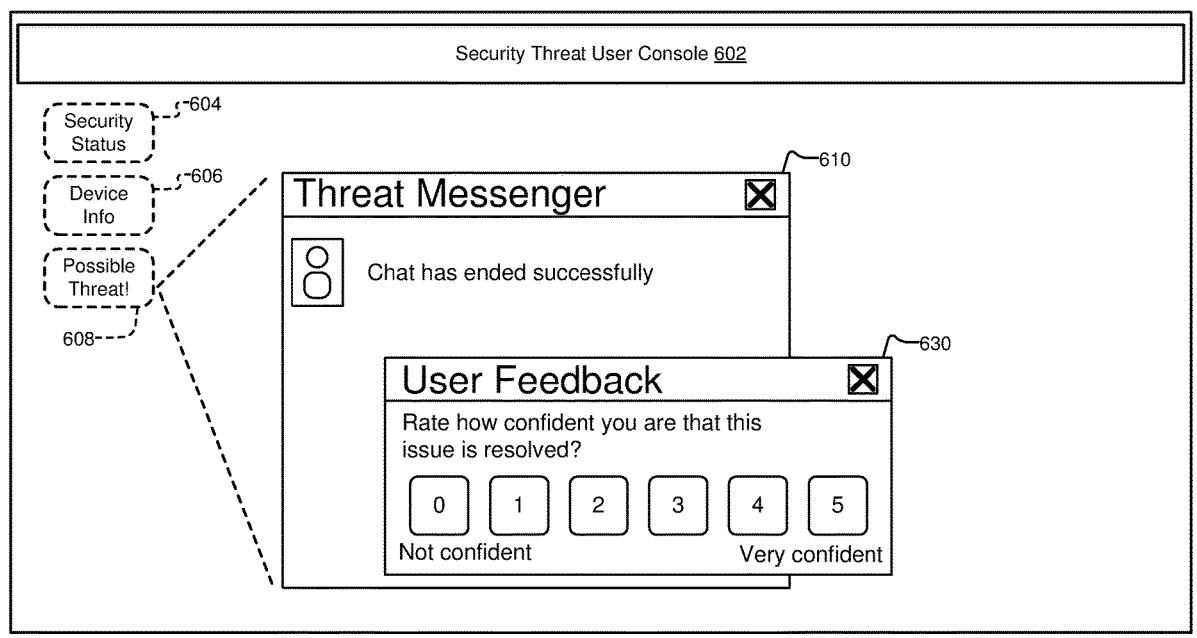
FIG. 6C is a diagram of an example user interface for indication of security threats from user devices, in accordance with some implementations.

Upon remediation, the chat interface 610 may indicate a chat session has ended, and optionally provide the user with an opportunity to provide feedback 630, as shown in FIG. 6C. The feedback 630 may take any form including, but not limited to, ratings, rankings, questionnaires, and other feedback mechanisms. The feedback 630 may be used to further inform future remedial activities and/or information related to user engagement with potential security threats.

Hereinafter, an additional user interface for managing indications of security threats is presented with reference to FIG. 7.

Figure 7:
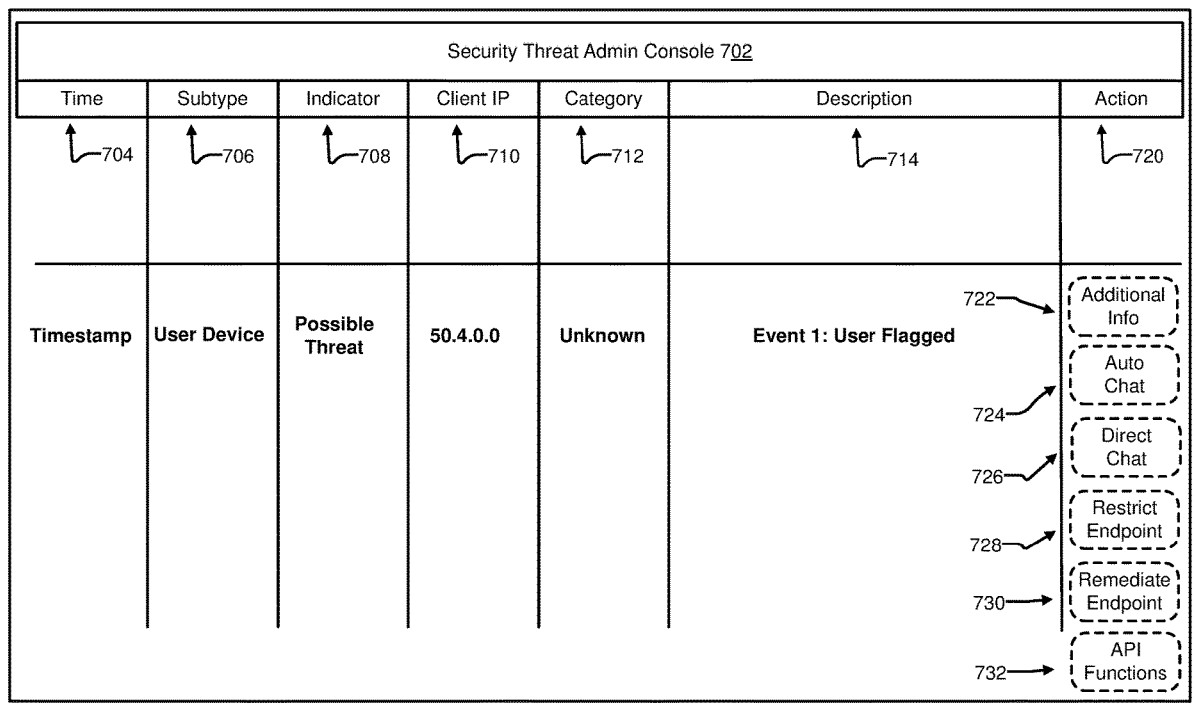
FIG. 7 is a diagram of an example user interface for monitoring of indications of security threats received from user devices, in accordance with some implementations.

FIG. 7 is a diagram of an example user interface 700 for monitoring of security threats from user devices. The user interface 700 may include a security threat administrator console 702 presented to a network administrator at a network administrator device.

As shown, the user interface 700 includes a display of possible security threats flagged by users, that may be identified by timestamps 704, subtypes 706, and indicators of security threats 708. For example, each timestamp 704 may represent a time of day and date under which an indication of security threat was received and an identified subtype of endpoint, which may include endpoints or user devices connected to the enterprise network. The indicator 708 may identify whether a particular threat is established or identifiable as a known threat, a possible threat, suspicious activity, and so on. Furthermore, a Client IP address 710 may identify a particular IP address associated with the security threat or user device.

To further aid in managing potential enterprise security threats, a categorization 712 may be used to group identified threats. For example, categories may include types of threats such as malware, trojans, viruses, malicious applications, and so on. In this example, "unknown" is used to indicate that a potential security threat is user-flagged. However, depending upon immediate actions of a security agent executing on a user device, category 712 may be updated periodically, automatically, and/or in response to changes or updates to a type or types of threats identified.

As further shown, a threat description, or other descriptive data 714 may be displayed. According to at least one implementation, the descriptive data 714 may identify a number of suspicious events (e.g., disk access, network access, etc.), malicious processes, or other data useful in determining if a potential threat warrants further action. In this manner, network administrators may have a robust, visible display of potential security vulnerabilities such that actions 720 may be selected.

The actions 720 may include receiving additional information 722, directing an automated chatbot to retrieve additional information from a user 724, opening a chat interface for chat interactions between a network administrator and a user 726, directing an endpoint to enter a restricted execution mode 728, remediating endpoints 730, and/or accessing other API functionality. In some implementations, the accessing of other API functionality may provide different actions to aid in remediating an endpoint and/or restricting processes and/or directing the device to enter a restricted execution mode.

In some implementations, the API may include all functions associated with: identifying potential security threats, restricting activity based on user identification data (e.g., usernames and/or credentials), restricting network activity, suspending processes at an endpoint, terminating processes at an endpoint, pausing all remote sessions associated with a user, stopping all events and/or processes associated with a user, and other functionality. The interface element 732 may direct the user interface 700 to refresh and present at least a portion of the additional functions, or may direct a new user interface to be displayed with at least a portion of the additional functions. It is noted that if API functions are initiated through the element 732 or the interface 700, the functions may be performed by any associated software services configured to execute those API functions.

Other actions may also be applicable in some implementations including "tagging" or coloring endpoints with suspicious activity, blocking requests to a particular network location or locations, scanning a requesting application or device, quarantine of a requesting application or the device, isolation of the requesting application or the device, deployment of a sandbox, blocking access to resources, e.g., a USB port, or other remedial actions, all responsive to a device transmitting an indication of security threat.

As described above, various methods are presented for receiving indications of security threats from user devices. Responsive to the indication of security threat, a network administrator may engage in chat or initiate an automated chatbot, selectively restrict processes on the user device to trusted processes, and perform other remedial actions. Upon remediation of the threat, the user device may be directed to display notification that a security threat was successfully remediated.

Hereinafter, a more detailed description of various computing devices that may be used to implement different devices (e.g., the server 14 and/or endpoints 12, 22) illustrated in FIG. 1 and FIG. 2 is provided with reference to FIG. 8.

Figure 8:
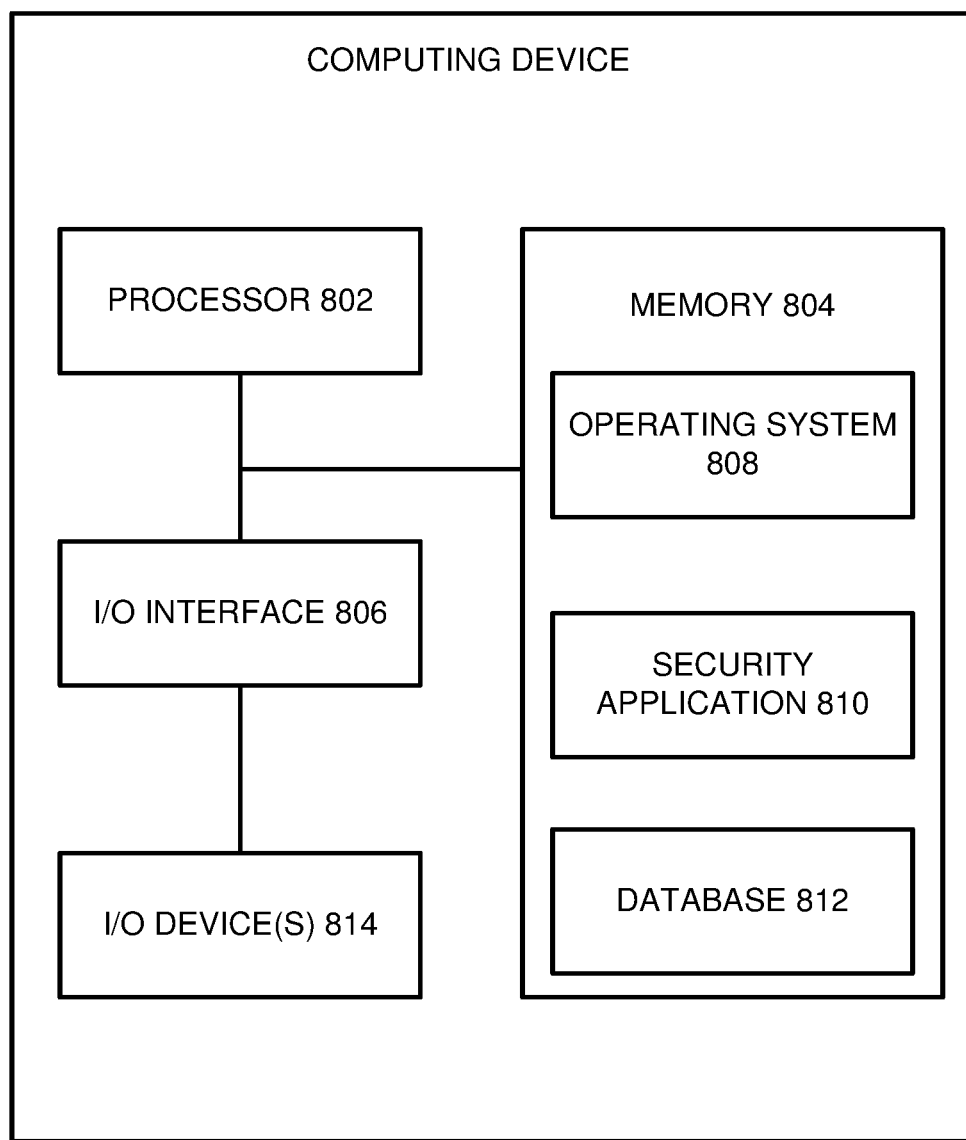
FIG. 8 is a block diagram illustrating an example computing device which may be used to implement one or more features described herein, in accordance with some implementations.

FIG. 8 is a block diagram of an example computing device 800 which may be used to implement one or more features described herein, in accordance with some implementations. In one example, device 800 may be used to implement a computer device, (e.g., 12 of FIG. 1), and perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814 (e.g., display screen, touchscreen, display goggles or glasses, audio speakers, microphone, etc.).

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, a security application or computer program product 810, and a database 812.

Memory 804 can include software instructions for executing the operations as described with reference to FIGS. 1-7. Any of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 116), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 8 shows one block for each of processor 802, memory 804, I/O interface 806, software blocks 808, and 810, and database 812. These blocks may represent one or more processors or processing circuitries, operating systems, memories, I/O interfaces, applications, and/or software modules. In other implementations, device 800 may not have all of the components shown and/or may have other elements including other types of elements instead of, or in addition to, those shown herein.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a user device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 814, for example, can be connected to (or included in) the device 800 to display images, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more user devices, servers, and threat management facilities. In some implementations, one or more methods described herein can be implemented, for example, on a server system with a dedicated threat management facility, and/or on both a server system and any number of threat management facilities. In some implementations, different components of one or more servers and or user devices can perform different blocks, operations, or other parts of the methods.

One or more methods described herein (e.g., method 500) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, comprising:
providing a graphical user interface (GUI) on a user device that enables a user to provide an indication of a security threat on the user device;
receiving the indication, via the GUI on the user device, of the security threat, wherein the indication of the security threat was initiated by the user;
transmitting, by the user device, the indication of the security threat to a centralized security service;
after the transmitting, receiving from the centralized security service, one or more questions based on the indication of the security threat;
presenting, at the user device, the one or more questions based on the indication of the security threat;
receiving one or more responses to the one or more questions from the user;
determining a set of trusted processes being executed on the user device from a set of processes being executed on the user device;
receiving, from an administrator device associated with the user device, a command to terminate or suspend processes that are not in the set of trusted processes;
placing the user device in a restricted execution mode such that processes included in the set of trusted processes are permitted to execute on the user device;
automatically remediating the security threat on the user device based upon the received one or more responses; and
subsequent to automatically remediating the security threat on the user device, lifting the restricted execution mode of the user device such that the processes not included in the set of trusted processes are permitted to execute on the user device in addition to the processes included in the set of trusted processes.

2. The computer-implemented method of claim 1, wherein the graphical user interface (GUI) is configured to display a selectable graphic element indicative of a perceived security threat; and wherein the user device includes a communication component configured to transmit the indication of the security threat to the centralized security service.

3. The computer-implemented method of claim 1, wherein the indication of the security threat includes one or more of:
an automated message originating at the user device and routed to an administrator device associated with the user device; or
an automated software ticket generated at the user device and transmitted to the centralized security service, wherein the automated software ticket includes a listing of processes executing on the user device at a time that the indication of the security threat is received.

4. The computer-implemented method of claim 3, further comprising:
responsive to automatically remediating the security threat, restarting at least a portion of the processes from the listing.

5. The computer-implemented method of claim 1, wherein the one or more questions based on the indication of the security threat comprise questions specifying whether the security threat is a real security threat or a false positive security threat.

6. The computer-implemented method of claim 5, further comprising:
determining that the security threat is the real security threat; and
wherein automatically remediating the security threat on the user device comprises receiving, from an administrator device associated with the user device, a command to initiate a security software suite, wherein the security software suite is configured to remediate the real security threat responsive to the command and the received one or more responses.

7. The computer-implemented method of claim 1, further comprising:
after remediating the security threat on the user device, rebooting the user device based on a command received from an administrator device associated with the user device, wherein the command utilizes a remote application programming interface (API) function exposed by the user device.

8. The computer-implemented method of claim 1, wherein presenting the one or more questions related to the indication of the security threat comprises:
executing an automated chatbot at the user device, wherein the automated chatbot is configured to present the one or more questions and receive the one or more responses from the user automatically.

9. The computer-implemented method of claim 1, wherein presenting the one or more questions related to the indication of the security threat comprises:
presenting a chat interface at the user device, wherein the chat interface comprises the one or more questions associated with the user device.

10. The computer-implemented method of claim 1, wherein the set of trusted processes comprises processes that are identifiable as being directed by one or more trusted software installations at the user device.

11. A computer program product having one or more non-transitory computer-readable media with instructions stored thereon that, responsive to execution by one or more processing devices, cause the one or more processing devices to perform operations comprising:
providing a graphical user interface (GUI) on a user device that enables a user to provide an indication of a security threat on the user device via a security threat indication service;
receiving the indication, via the GUI on the user device, of the security threat, the indication of the security threat initiated by the user;
transmitting, by the user device, the indication of the security threat to a centralized security service;
after the transmitting, receiving from the centralized security service, one or more questions based on the indication of the security threat;
presenting, at the user device, the one or more questions based on the indication of the security threat;
receiving one or more responses to the one or more questions from the user;
determining a set of trusted processes being executed on the user device from a set of processes being executed on the user device;
receiving, from an administrator device associated with the user device, a command to terminate or suspend processes that are not in the set of trusted processes;
placing the user device in a restricted execution mode such that processes included in the set of trusted processes are permitted to execute on the user device;
automatically remediating the security threat on the user device based upon the received one or more responses; and
subsequent to automatically remediating the security threat on the user device, lifting the restricted execution mode of the user device such that the processes not included in the set of trusted processes are permitted to execute on the user device in addition to the processes included in the set of trusted processes.

12. The computer program product of claim 11, wherein the graphical user interface (GUI) is configured to display a selectable graphic element indicative of a perceived security threat; and wherein the user device includes a communication component configured to transmit the indication of the security threat to the centralized security service.

13. The computer program product of claim 11, wherein the indication of the security threat includes one or more of:
an automated message originating at the user device and routed to an administrator device associated with the user device; or
an automated software ticket generated at the user device and transmitted to the centralized security service, wherein the automated software ticket includes a listing of processes executing on the user device at a time that the indication of the security threat is received.

14. The computer program product of claim 11, wherein the one or more questions based on the indication of the security threat comprise questions specifying whether the security threat is a real security threat or a false positive security threat.

15. The computer program product of claim 14, wherein the operations further comprise:
determining that the security threat is the real security threat; and
wherein automatically remediating the security threat on the user device comprises receiving, from an administrator device associated with the user device, a command to initiate a security software suite, wherein the security software suite is configured to remediate the real security threat responsive to the command and the received one or more responses.

16. The computer program product of claim 11, wherein the operations further comprise:
responsive to automatically remediating the security threat on the user device, rebooting the user device through a command from an administrator device associated with the user device, wherein the command utilizes a remote application programming interface (API) function exposed by the user device.

17. The computer program product of claim 11, wherein presenting the one or more questions related to the indication of the security threat comprises:
   executing an automated chatbot at the user device, wherein the automated chatbot is configured to present the one or more questions and receive the one or more responses from the user.

18. A threat management computer system for managing active security threats on an enterprise network, comprising:
   one or more non-transitory, computer-readable media with instructions stored thereon;
   one or more processing devices, in communication with the one or more non-transitory, computer-readable media, wherein the one or more processing devices are configured to execute the instructions; and
   one or more network devices in communication with the one or more processing devices and configured to receive indications of security threats from a plurality of user devices, wherein the instructions cause the one or more processing devices to perform operations including:
      providing a graphical user interface (GUI) on a user device that enables a user to provide an indication of a security threat on the user device;
      receiving the indication, via the GUI on the user device, of the security threat, wherein the indication of the security threat has been initiated by the user;
      transmitting, by the user device, the indication of the security threat to a centralized security service;
      after the transmitting, receiving from the centralized security service, one or more questions based on the indication of the security threat;
      presenting, at the user device, the one or more questions based on the indication of the security threat;
      receiving one or more responses to the one or more questions from the user; and
      determining a set of trusted processes being executed on the user device from a set of processes being executed on the user device;
      receiving, from an administrator device associated with the user device, a command to terminate or suspend processes that are not in the set of trusted processes;
      placing the user device in a restricted execution mode such that processes included in the set of trusted processes are permitted to execute on the user device;
      automatically remediating the security threat on the user device based upon the received one or more responses; and
      subsequent to automatically remediating the security threat on the user device, lifting the restricted execution mode of the user device such that the processes not included in the set of trusted processes are permitted to execute on the user device in addition to the processes included in the set of trusted processes.

* * * * *